United States Patent Office 3,822,199
Patented July 2, 1974

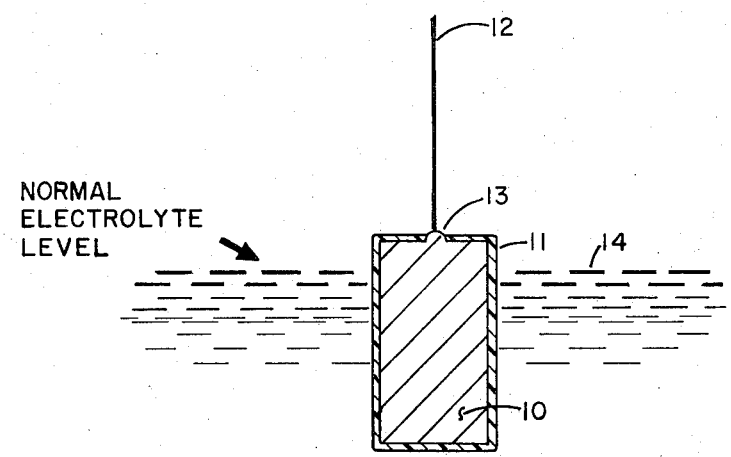

3,822,199
ELECTRODE
James R. Luck, Burnsville, and Thomas N. Zenk, Bloomington, Minn., assignors to Honeywell Inc., Minneapolis, Minn.
Filed Apr. 5, 1972, Ser. No. 241,283
Int. Cl. B01k 3/06; G01n 27/30
U.S. Cl. 204—195 M
11 Claims

ABSTRACT OF THE DISCLOSURE

An improved specific-ion measuring electrode for the electrolytic determination of fluoride ion activity in aqueous solution has as its ion-sensitive element an inner electrode which is covered with a layer of polymer membrane which both exhibits diffusion-limiting properties and contains pH biasing groups which exhibit acidic properties in aqueous solution, thereby both limiting the consumption of the aluminum electrode in the determination reaction and eliminating the long-standing requirements of both constantly agitating the measured solution and buffering that solution to maintain a constant pH. Preferred membranes are sulfonated, cross-linked polyvinyl aromatic materials such as polystyrene. A method of making the electrode is also disclosed which includes in situ polymerization of the monomer and incorporation of the acidic groups thereafter in the process.

BACKGROUND OF THE INVENTION

Field of the Invention

This invention relates to the electrochemical detection and measurement of the presence of specific ions such as fluoride ions and, more particularly, to an improved measuring electrode for use in such detection.

Description of the Prior Art

In the prior art, there have been developed a class of electrochemical specific-ion electrodes which can be used to detect single ion species in an electrolytic solution. It has long been known that fluoride ion concentrations in aqueous solution may be determined by measuring the current produced in a spontaneous electrolysis cell provided with an essentially pure aluminum measuring electrode and a noble metal reference electrode. Such a system is illustrated and described in U.S. Pat. No. 2,870,067. Another U.S. Pat. No. 3,058,901 illustrates and describes an electrochemical cell for the determination of fluorides utilizing a bare, essentially pure, aluminum measuring electrode and a platinum reference electrode immersed in a continuously flowing electrolyte.

In all of these prior art devices for measuring the concentration of fluoride ions in acidic aqueous solution, it has been found necessary to control the pH of the solution within close tolerances because the current generated in the spontaneous electrolysis cell is also extremely sensitive to the pH of the measuring solution. It has therefore been necessary to carefully buffer the solution to control the pH within a specific, narrow range to achieve any type of reproducibility in the generated signal. It has also been found necessary to move the electrode with respect to the sample solution as by agitation or stirring in order to maintain a constant rate of diffusion of the electroactive ions into the reactive sites on the measuring electrode. These criteria, of course, have led to the development of specific-ion electrochemical fluoride detectors utilizing complicated buffered electrolyte solutions to maintain the constant pH and mechanically rotated measuring electrodes to maintain a constant electrode movement with reference to the solution to be measured. Because of these requirements, the devices of the prior art utilizing such a system have been complex, extremely hard to maintain and generally not very dependable.

SUMMARY OF THE INVENTION

According to the present invention, there is provided an improved electrode for measuring specific-ion concentration in an electrochemical cell which overcomes both the rigid pH and relative motion requirements associated with the prior art devices. According to the present invention, a bare metallic electrode is covered with a diffusion limiting polymer membrane which contains active pH biasing groups from a class which exhibit acidic properties in aqueous solution, thereby both limiting the diffusion rate of ionic reactants, thus making the current reading independent of the rate of relative motion between the solution and the electrode, and providing a built-in solution buffer to artifically create the required pH environment at the reaction sites. Because of their increased buffering activity, polymers containing aromatic groups are preferred. Examples of such polymer membranes which may be used are cross-linked polystyrene or a styrene-divinylbenzene copolymer. The active pH biasing groups which may be bonded to the polymer molecules include $SO_3^{-2}$, $CO_3^{-2}$, $PO_3^{-2}$, $HPO_2^-$, $AsO_3^{-2}$, and $SeO_3^-$, and phenolic hydroxide. The preferred method for producing the electrode of the invention includes coating the base metal electrode with a monomer of the desired membrane, polymerizing the monomer in situ and, finally, reacting the polymerized membrane with the proper reagent to incorporate the desired pH biasing group.

BRIEF DESCRIPTION OF THE DRAWING

In the drawing wherein like numerals are used to designate like parts throughout the same:

The single figure depicts a typical electrode in accordance with the invention.

DESCRIPTION OF THE PREFERRED EMBODIMENT

It should be noted that while the following description is limited to a covered aluminum electrode for the detection of fluoride ion in an electrochemical cell the invention is readily adaptable to coating other metallic electrodes for the specific detection of other ions in a buffered acidic solution.

Turning now to the drawing, we see a typical example embodiment of the electrode of the invention including an aluminum inner electrode 10, having a covering 11 thereon, which will be more completely described later. An electrical lead 12 is attached to the aluminum electrode 10 by conventional methods at 13. The typical operating level of the electrolyte solution into which the electrode is placed is indicated at 14.

The basic aluminum electrode 10 which forms the fluoride ion sensitive inner portion of the composite electrode of the invention may be constructed of aluminum of normal commercial purity so long as interfering species such as silicon are present in no more than trace amounts. Thus, unlike some of the prior art systems, there is no need to use highly refined extremely pure aluminum. The aluminum inner electrode 10 may be of any shape campatible with the design of the electrochemical cell involved. Thus, a wire, rod or even a rectangular block of aluminum may be used as the inner electrode. The only limiting factor in the size of the inner aluminum electrode is related to the fact that the signal produced by the reaction of the fluoride ions with the aluminum electrode is directly proportional to the area of the aluminum electrode which is exposed to the solution containing the fluoride ion. Therefore it is advantageous to make the aluminum electrode as large as possible to expose the greatest amount of area to the fluoride ion containing measured solution. Of course, any electrode size which produces a signal of sufficient strength to be accurately measured within the fluoride ion concentration range desired to be monitored by the electrochemical cell will be sufficient.

The normal practical range of fluoride ion concentrations which would be measured by a device of the type described is from about $10^0$ to $10^{-6}$ M. For determinations within this range, an inner electrode consisting of an aluminum rod having a diameter of approximately one-quarter inch and a length of approximately one-half inch immersed in the measured solution has yielded quite satisfactory results.

The most important aspect of the present invention is the covering of the aluminum electrode which enables the fluoride ion detecting electrolytic cell system to operate independent of both a critical pH requirement in the measured sample solution and the relative motion requirement. This is accomplished by providing an integral overlayer or coating to cover the portion of the aluminum electrode exposed to the sample solution which combines the requisite chemical properties of inertness to the electrochemical cell environment and pH biasing or buffering at the signal-producing reaction site and the physical properties of durable adhesion to the inner aluminum electrode and the ability to limit the diffusion of the electroactive fluoride ion species sought to be determined.

As mentioned above, the magnitude of the signal produced by the reaction of fluoride ions on an aluminum electrode and an aqueous electrolyte is highly dependent upon the pH of the sample solution. In the high pH or alkaline range, the presence of fluoride ion has little or no effect upon the signal produced by such a cell; whereas in an acid medium, an aluminum electrode is readily depolarized by fluoride ions, causing a spontaneous electrolysis current to be generated which is substantially proportional to the concentration of the fluoride ion in the solution. Because the magnitude of the spontaneously generated current is highly dependent on the degree of acidity of the electrolyte solution, the pH of such solution must remain essentially constant for the fluoride concentration measurements to be reproducible. Thus, prior solutions normally involved a complex buffering arrangement such that the pH of the sample solution remained constant, normally at some point in the range from about pH 2 to pH 6 with a pH of 3.5 preferred.

According to the present invention, it has been found that a polymer covering on the electrode having the requisite physical properties and containing, on its molecular structure, active pH biasing groups from a class which exhibit acidic properties in an aqueous electrolyte solution provides the required reaction environment. Such groups include (in order of normally decreasing acidity and including both aryl and alkyl types) sulfonic acid, carboxylic acid, phosphonic acid, phosphinic acid, arsonic acid, selonic acid and phenol-formaldehyde resins.

According to the invention, excellent materials for use as coverings on the aluminum electrode which combine all of the desired properties include both polyacid polymers such as, for example, polyacrylic acid and sulfonated vinylaromatic polymers including sulfonated cross-linked polystyrene and sulfonated copolymers of styrene and divinylbenzene. Although membranes containing any of the above-mentioned groups will provide a requisite solution buffering at the fluoride ion-aluminum electrode reaction sites, the more highly acidic groups such as sulfonic acid and carboxylic acid are preferred. One highly successful membrane covering has been prepared by dipping the formed aluminum electrode into a solution containing monomeric styrene and divinylbenzene into which a polymerizing agent such as benzoylperoxide, for example, has been added. The styrene-divinylbenzene mixture is then polymerized in situ on the dipped aluminum electrode by heating the electrode to the polymerization temperature in a well-known manner. The polymer covering on the electrode is then sulfonated, also in a well-known manner, in a solution of chlorosulfonic acid or sulfuric acid to provide arylsulfonic acid ionic sites on the copolymer. In accordance with the above method, the degree of sulfonation of the copolymer is not critical and an exposure of the polymer to a 2%–10% solution of chlorosulfonic acid in a chlorinated solvent such as chloroform or ethylene dichloride for a period of from about 5 minutes to 6 hours and at room temperature gives excellent results. In connection of the above coating of the aluminum electrode, any other well-known method of preparing same can be employed such as dipping the electrode into the monomer solution and thereafter polymerizing the monomer mixture in a solution containing the polymerization agent.

It is also contemplated that various other well-known methods of producing such a covering may be employed such as preforming the polymer membrane and subsequently covering the inner electrode with same.

The sulfonated styrene-divinylbenzene copolymer membrane covering thus produced has been shown to exhibit excellent pH biasing properties when used to detect fluoride ion concentrations in acidic aqueous solution. The coating remains substantially unaffected by the environment of the electrolytic solution used to detect the concentration of fluoride ion which is normally an aqueous solution of acetic acid, initially at about pH 3.5. The presence of the sulfonic acid groups on the copolymer molecules in the vicinity of the measured signal producing reaction sites between the fluoride ions and the outer surface of the aluminum electrode provides the required pH biasing to maintain a relatively constant acidic condition at the fluoride ion-aluminum electrode reaction sites to greatly stabilize the reproducibility of the signal obtained for a given concentration of fluoride ion in the solution. Thus, while the membrane of the invention does not entirely eliminate the requirement for using a buffered acid solution as the basic measuring solution for the fluoride ion concentration, it does substantially eliminate the requirement for constant monitoring and regulation of the pH at a given value once that value is established as a basis for fluoride ion concentration measurement.

In addition to the above excellent chemical properties, the sulfonated styrene-divinylbenzene polymer membrane also exhibits the desired physical properties. As mentioned above, with the pure aluminum electrodes of the prior art devices, in addition to maintaining a constant pH in the measured solution, it was also necessary to move the aluminum electrode relative to that solution in a constant velocity in order to maintain the reproducibility of a given signal for a given fluoride ion concentration. Ths is thought to be because a capacitive double layer is formed on the surface of the aluminum electrode in the acidic solution containing fluoride ions such that fluoride ions have to diffuse through that layer in order to spontaneously react at the surface of the aluminum electrode. While the exact phenomenon involved in the formation of the capacitive double layer is not fully understood, it is thought to be due to the deposition of aluminum hydroxide on the pure aluminum electrode surface which inhibits the diffusion of fluoride ions to that surface. In any event, it was found that by maintaining a constant relative velocity between the pure aluminum electrode and the measured solution, effect of the capacitive double layer was neutralized, probably by allowing it to reach an equilibrium thickness. The covering membrane of the present invention obviates this long-standing problem by providing an integral, constant artificial diffusion barrier which provides a constant diffusion limiting barrier between the aluminum electrode surface and the external solution to be measured. In this manner, the equilibrium thickness of the capacitive double layer which results in a constant diffusion coefficient is preserved without the necessity for any constant solution stirring or electrode movement. In addition, the polymer coating membrane of the invention shows the desirable physical property of good adherence to the surface of the aluminum electrode to produce an integral structure therewith.

While the membrane of the invention has been described in particular as a sulfonated copolymer of styrene and divinylbenzene, and aromatic containing polymers are preferred, may other polymers having other or the same acidic groups attached thereto can readily be substituted for the one described by one skilled in the art. For example, good results can be produced with sulfonated cross-linked polystyrene, sulfonated styrene-butadiene and various polyacid polymers which have carboxylic acid groups attached such as, polyacrylic acid, for example.

While the thickness of the membrane has not been found to be critical, it should be kept thin to promote a rapid, uniform diffusion of fluoride ions into the aluminum electrode. Thus, membranes in the range of from 0.1 mils to 10 mils thick have been found to work quite satisfactorily. The thickness may be controlled in the production of the coated electrodes by diluting the original monomer mixture or mixture of monomer cross-linking agent and polymerization catalyst into which the electrode is originally dipped with a solvent of that monomer in a proportion which produces the viscosity desired or needed to give a specific thickness and one skilled in the art will be familiar with such procedure. For example, in the dipping process, the styrene-divinylbenzene monomer mixture of the preferred embodiment may be diluted with a quantity of xylene or other suitable solvent to produce a coating of the desired thickness.

The composite electrode of the present invention, then, provides a suitable measuring half-cell electrode for use in an electrochemical cell of the spontaneous-reaction type for monitoring the concentration of fluoride ion. The electrode of the invention may be combined in conventional fashion with any conventional reference electrode, as a noble metal electrode and conventional external circuitry to monitor the output signal in any well-known way.

The embodiments of the invention in which an exclusive property or right is claimed are defined as follows:

1. A measuring electrode for determining the presence of fluoride ions in an aqueous acidic medium in an electrochemical cell, said measuring electrode comprising an aluminum inner electrode member, said inner electrode member provided with an outer covering of an ion-exchange type polymeric material, wherein said polymeric material is one selected from a group consisting of compounds which (a) are substantially unaffected by said acidic aqueous electrolyte solution and said fluoride ion species,
(b) allow diffusion of said fluoride ion species to said aluminum inner electrode,
(c) contains sites of acidic pH biasing functional groups which are active in aqueous solutions, wherein said functional groups are selected from a group consisting of sulfonic acid, carboxylic acid, phosphonic acid, phosphinic acid, arsonic acid, selenonic acid and phenolic hydroxide.

2. An electrode as claimed in claim 1, wherein said polmyeric material is one containing cross-linked vinyl aromatic groups.

3. An electrode as claimed in claim 2, wherein said polymeric material is cross-linked polystyrene.

4. An electrode as claimed in claim 3, wherein said pH biasing functional group is sulfonic acid.

5. An electrode as claimed in claim 3, wherein said polymeric covering in said inner electrode member has a thickness in the range of from between 0.0001 inch to 0.01 inch.

6. An electrode as claimed in claim 2, wherein said polymeric material is a copolymer of styrene and divinylbenzene.

7. An electrode as claimed in claim 6, wherein said pH biasing functional group is sulfonic acid.

8. An electrode as claimed in claim 6, wherein said polymeric covering on said inner electrode member has a thickness in the range of from between 0.0001 inch and 0.01 inch.

9. An electrode as claimed in claim 2, wherein said polymeric material is a copolymer of styrene and butadiene.

10. An electrode as claimed in claim 9, wherein said pH biasing functional group is sulfonic acid.

11. An electrode as claimed in claim 9, wherein said polymeric covering on said inner electrode member has a thickness in the range of from between 0.0001 inch to 0.01 inch.

References Cited
UNITED STATES PATENTS

| | | | |
|---|---|---|---|
| 3,413,209 | 11/1968 | Hersch | 204—195 R |
| 3,591,482 | 7/1971 | Neff et al. | 204—195 F |

GERALD L. KAPLAN, Primary Examiner

U.S. Cl. X.R.

204—290 F